United States Patent [19]
Dickers et al.

[11] Patent Number: 5,964,201
[45] Date of Patent: Oct. 12, 1999

[54] METHOD FOR OPERATING A MULTICYLINDER INTERNAL COMBUSTION ENGINE AND DEVICE FOR CARRYING OUT THE METHOD

[75] Inventors: Guido Dickers, Moenchengladbach; Klemens Grieser, Langenfeld; Patrick Phlips; Thomas E. Mayer, both of Cologne, all of Germany

[73] Assignee: Ford Global Technologies, Inc., Dearborn, Mich.

[21] Appl. No.: 09/044,344

[22] Filed: Mar. 19, 1998

[51] Int. Cl.$^6$ .................................................. F02B 31/00
[52] U.S. Cl. ............................................ 123/306; 123/295
[58] Field of Search .................................. 123/306, 308, 123/301, 302, 188.14

[56] References Cited

U.S. PATENT DOCUMENTS

| | | | |
|---|---|---|---|
| 5,056,491 | 10/1991 | Tsukamoto | 123/308 |
| 5,146,885 | 9/1992 | Fukuma et al. | 123/308 |
| 5,255,648 | 10/1993 | Hokazono et al. | 123/308 |
| 5,394,845 | 3/1995 | Noh et al. | 123/308 |
| 5,704,333 | 1/1998 | Okumura et al. | 123/308 |

*Primary Examiner*—Erick R. Solis
*Attorney, Agent, or Firm*—Allan J. Lippa

[57] ABSTRACT

The invention relates to a method for operating a multicylinder internal combustion engine having a device, preferably an asymmetric swirl valve, located in the cylinder inlet passage and selectively movable by means of a control unit from a starting position into an effective position, for influencing the flow conditions in the cylinder inlet passage. In known methods the swirl control valve is brought into its effective position in a predetermined rotational speed/torque region and the engine is operated with a stoichiometric or rich mixture. Outside this region the swirl control valve is brought into its starting position and the engine is operated using a substantially stoichiometric or rich mixture. In contrast to this, a saving in fuel is obtained by bringing the swirl control valve into the starting position in a second predetermined rotational speed/torque region lying outside the predetermined first rotational speed/torque region and at the same time operating the internal combustion engine using a lean mixture.

5 Claims, 1 Drawing Sheet

METHOD FOR OPERATING A MULTICYLINDER INTERNAL COMBUSTION ENGINE AND DEVICE FOR CARRYING OUT THE METHOD

FIELD OF THE INVENTION

The invention relates to a method for operating a multi-cylinder internal combustion engine having a device, located in the cylinder inlet passage and selectively movable by means of a control unit from a starting position into an effective position, for influencing the flow conditions in the cylinder inlet passage, wherein in the effective position of the device the combustion stability in the case of mixtures with a lean air/fuel ratio is increased and in a predetermined rotational speed/torque region the device is brought into the effective position and the internal combustion engine is operated with a lean mixture, and to a device for carrying out the method.

BACKGROUND AND PRIOR ART

Known means for influencing the flow conditions include, for example, swirl control valves, which are located within a cylinder inlet passage having in each case two inlet valves at the outlet end. Each swirl control valve can be brought by a control member controllable by the electronic engine control unit into a starting position substantially parallel to or into an effective position transverse to the main direction of flow in the inlet passage.

In the effective position the flow conditions are influenced so as to make more stable combustion possible, particularly at lean air/fuel ratios. By selective use of such a swirl control valve the proportion of fuel in a lean engine mixture can be decreased without causing combustion instabilities such as misfires. This is desirable with regard to decrease in the nitrogen oxides emissions, since in principle the leaner the engine is operated, the lower is the emission of nitrogen oxides.

However, in the effective position the swirl control valve has a relatively high resistance to flow. Consequently flow losses occur which limit the maximum air/fuel throughput into the cylinder. Hence at higher rotational speed/torque requirements it is necessary to move the swirl control valve from the effective position into the starting position in order to obtain an adequate throughput of air. It is further known to operate the internal combustion engine using a stoichiometric to rich mixture at relatively high rotational speed or torque requirements such as occur, for example, under full load conditions or in the case of acceleration of the vehicle, since in this case the torques obtainable in lean burn operation are inadequate.

For these reasons in known methods the internal combustion engine is operated in a predetermined rotational speed/torque region with a lean air/fuel ratio while at the same time the swirl control valves are in the effective position, while in the case of higher rotational speed/torque requirements falling outside this region the swirl control valve is brought into the starting position and at the same time the engine is operated using a substantially stoichiometric or rich mixture. However, the fuel economy is adversely affected by the stoichiometric or rich mixture.

OBJECT OF THE INVENTION

The object of the present invention is to improve a method of the kind referred to above so as to obtain as effective a use of fuel as possible even at higher torques and engine speeds.

SUMMARY OF THE INVENTION

To this end, in accordance with the invention the swirl control valve is brought into the starting position and the internal combustion engine is operated using a lean mixture in a second predetermined rotational speed/torque region lying outside the predetermined first rotational speed/torque region.

Thus the invention provides an additional rotational speed/torque region in which the engine can be operated substantially without flow losses through the swirl control valve. Lean burn operation is thereby made possible in rotational speed/torque regions in which the internal combustion engine has hitherto been operated stoichiometrically.

The second predetermined rotational speed/torque region preferably includes higher rotational speeds and/or higher torques than the first predetermined rotational speed/torque region.

Dispensing with the effect of the swirl control valve in the second rotational speed/torque region is in general possible because at higher absolute fuel excursions such as, for example, are needed to produce the higher rotational speeds and/or torques in this second region, the stability of the combustion process tends to increase.

Beside the above-mentioned rotational speed/torque regions it is advantageous to provide further rotational speed/torque regions in which the engine is operated using a stoichiometric or rich mixture in order to meet the rotational speed or torque demands arising, for example, in full load operation.

In particular it can be provided that the device is brought into its effective position, and the internal combustion engine is operated with a substantially stoichiometric air/fuel ratio, in a third rotational speed/torque region lying outside the first and second rotational speed/torque regions. Compared with the first region this third region preferably includes lower rotational speeds and/or torques such as occur, for example, in overrun operation of a vehicle incorporating the internal combustion engine.

In an advantageous embodiment of the invention it can furthermore be provided that a change in torque of the internal combustion engine caused by the bringing of the device into the starting position or the effective position is compensated by action on the position of a throttle valve controlling the air throughput of the internal combustion engine. This can prevent a change in the throttle valve position resulting in a change in the speed of the vehicle noticeable to the driver.

In a device for carrying out the method of the invention, the device for influencing the flow conditions in the cylinder inlet passage is in the form of an asymmetrical swirl valve.

It can further be provided that the cylinder inlet passage has two inlet valves at its outlet end, and that the geometry of the cylinder inlet passage and the inlet valves are formed so as to produce tumble flow of the mixture in the cylinder.

BRIEF DESCRIPTION OF THE DRAWINGS

The invention will now be described in more detail, by way of example, with reference to the drawings, in which the first

DETAILED DESCRIPTION OF PREFERRED EMBODIMENTS OF THE INVENTION

A motor vehicle (not shown) is provided in known manner with an electronic engine control unit. The engine control unit determines from the input data from various sensors the current engine speed and the current required torque. In dependence on these data various engine parameters are determined in known manner using a predetermined look-up table in memory or using predetermined functional relationships, these parameters including in particular the position of an asymmetric swirl control valve located in the cylinder inlet system and an instruction for the composition of the air/fuel mixture (lean, stoichiometric or rich).

Figure 1:
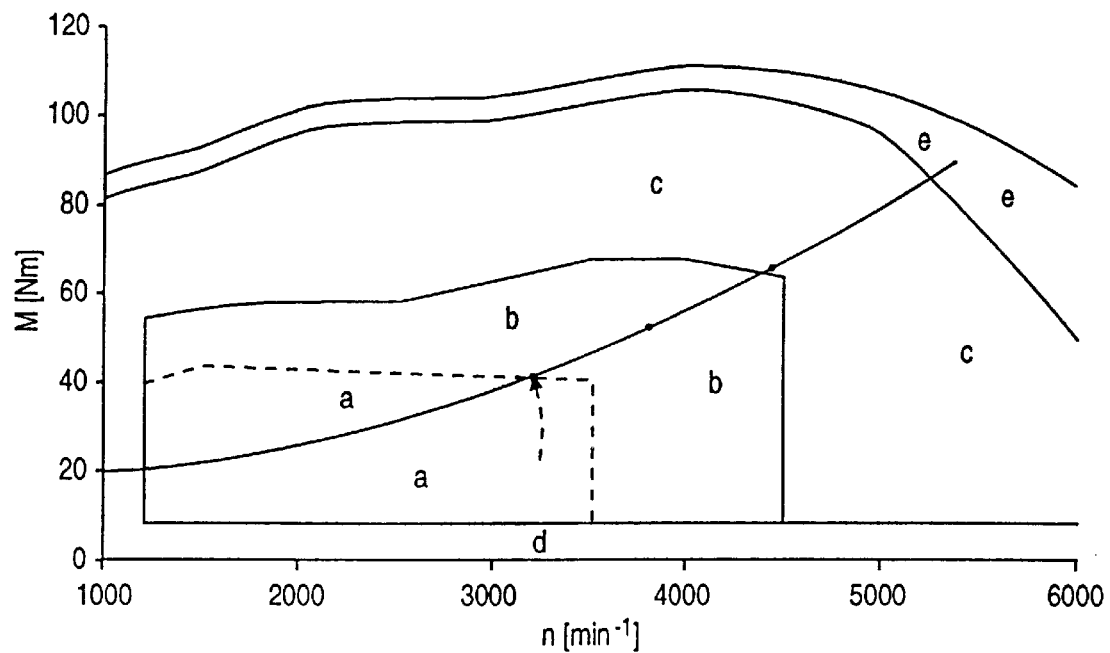
FIG. 1 shows a schematic rotational speed/torque diagram for control of a motor vehicle internal combustion engine in accordance with the present invention, the engine torque M being plotted on the Y axis against the engine speed n on the X axis.
Figure 2:
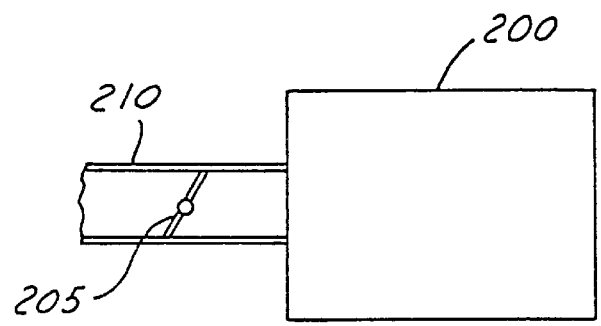
FIG. 2 shows internal combustion engine (200) having swirl control valve (205) located in cylinder inlet passage (210).

As shown in the FIG. 1, five rotational speed/torque regions a to e can be distinguished, the boundary lines between them being denoted by 1, 3, 4 and 5 respectively. The rotational speed/torque regions a to e are explained in more detail as follows:

Region a: Operation of the engine with a lean mixture, with the swirl control valve brought into its effective position to ensure stable combustion with as lean a mixture as possible;

Region b: Operation of the engine with a lean mixture at higher rotational speeds and/or torques, with the swirl control valve brought into its starting position in order to decrease flow losses;

Region c: Operation of the engine with a substantially stoichiometric air/fuel ratio and with the swirl control valve in the starting position;

Region d: Stoichiometric operation of the engine with the swirl control valve in the effective position (overrun operation);

Region e: Operation with enriched (rich) mixture and the swirl control valve in the starting position (full load enrichment).

The advantage of the method in accordance with the invention is clear from the driving resistance curve 2 shown by way of example. In the usual method the internal combustion engine would be operated stoichiometrically from the point denoted by I, whereas with the method in accordance with the invention fuel-saving lean burn operation can be maintained up to the point II. Thus known lean mixture engines can be operated with a lean mixture at speeds of up to 140 km/h, whereas using known methods under the same conditions the transition to stoichiometric operation would already take place from about 100 km/h.

When torque requirements are very low—e.g. in overrun operation when the vehicle is descending a hill—the engine is operated in the region d with the swirl control valve in the effective position and stoichiometric air/fuel ratio. In this region stoichiometric operation is preferable to lean burn operation, since it makes stable combustion possible with lower absolute fuel excursions compared to lean burn operation.

Bringing the swirl control valve into the starting position or into the effective position causes a change in the engine torque. So that the driver of the vehicle does not become aware of this, it is compensated by action on the position of a throttle valve controlling the air throughput of the internal combustion engine.

What is claimed is:

1. A method for operating a multicylinder internal combustion engine having a swirl control valve, located in the cylinder inlet passage and selectively movable by means of a control unit from a starting position into an effective position, for influencing the flow conditions in the cylinder inlet passage, wherein in the effective position of the swirl control valve the combustion stability in the case of mixtures with a lean air/fuel ratio mixture is increased and in a predetermined rotational speed/torque region the swirl control valve is brought into the effective position and the internal combustion engine is operated with a lean mixture, wherein the swirl control valve is brought into the starting position and the internal combustion engine is operated using a lean mixture in a second predetermined rotational speed/torque region (b) lying outside the predetermined first rotational speed/torque region (a).

2. A method as claimed in claim 1, wherein the second predetermined rotational speed/torque region (b) preferably includes higher rotational speeds and/or higher torques than the first predetermined rotational speed/torque region (a).

3. A method as claimed in claim 2, wherein in a third rotational speed/torque region (d) lying outside the first (a) and second (b) rotational speed/torque regions said swirl control valve is brought into its effective position and the internal combustion engine is operated using a substantially stoichiometric air/fuel ratio.

4. A method as claimed in claim 3, wherein in a change in torque of the internal combustion engine caused by the bringing of said swirl control valve into the starting position or into the effective position is compensated by action on the position of a throttle valve controlling the air throughput of the internal combustion engine.

5. A device for carrying out the method claimed in claim 4, wherein the cylinder inlet passage is provided with two inlet valves at its outlet end.

* * * * *